(12) United States Patent
Coyle

(10) Patent No.: US 7,376,909 B1
(45) Date of Patent: May 20, 2008

(54) DIGITAL CALENDAR

(76) Inventor: Timothy P Coyle, 2859 Weeks Ave., Oceanside, NY (US) 11572

( * ) Notice: Subject to any disclaimer, the term of this patent is extended or adjusted under 35 U.S.C. 154(b) by 760 days.

(21) Appl. No.: 10/638,738

(22) Filed: Aug. 11, 2003

(51) Int. Cl.
*G06F 15/00* (2006.01)
*G06F 13/00* (2006.01)

(52) U.S. Cl. ...................... 715/778; 715/788

(58) Field of Classification Search ........ 715/853–854, 715/712–713, 721, 765, 778, 788, 803–810, 715/851, 797, 798
See application file for complete search history.

(56) References Cited

U.S. PATENT DOCUMENTS

| | | |
|---|---|---|
| 3,916,172 A | 10/1975 | Engle, Jr. |
| 3,999,050 A | 12/1976 | Pitroda |
| 4,152,768 A | 5/1979 | Kuriya |
| 4,162,610 A | 7/1979 | Levine |
| 4,233,681 A | 11/1980 | Murata |
| 4,353,178 A | 10/1982 | Maezawa |
| 4,591,840 A | 5/1986 | Curtis et al. |
| 4,630,934 A | 12/1986 | Arber |
| 4,645,238 A | 2/1987 | Vincent et al. |
| 4,712,923 A | 12/1987 | Martin |
| 4,774,697 A | 9/1988 | Aihara |
| 4,780,839 A | 10/1988 | Hirayama |
| 5,220,540 A | 6/1993 | Nishida et al. |
| 5,936,625 A * | 8/1999 | Kahl et al. .................. 715/775 |
| 6,370,554 B1 | 4/2002 | Sun-Woo |
| 7,109,848 B2 * | 9/2006 | Schybergson ............ 340/309.7 |
| 2002/0166127 A1* | 11/2002 | Hamano et al. ............ 725/105 |
| 2003/0014296 A1* | 1/2003 | Meine .......................... 705/9 |

FOREIGN PATENT DOCUMENTS

| | | |
|---|---|---|
| CA | 1090590 | 8/2002 |
| JP | 2134675 | 5/1990 |
| JP | 2001083267 | 3/2001 |

\* cited by examiner

*Primary Examiner*—Cao (Kevin) Nguyen
(74) *Attorney, Agent, or Firm*—Michael I Kroll

(57) ABSTRACT

The present invention is a digital calendar that is selectively mountable on a surface for recording and storing information about events that are important to a user. The digital calendar contains data relating to each month of the present year as well as data relating to future years so that a user never has to purchase a new calendar.

10 Claims, 14 Drawing Sheets

DIGITAL CALENDAR

BACKGROUND OF THE INVENTION

1. Field of the Invention

The present invention relates generally to calendars, more specifically, to a digital calendar that is selectively mountable on a surface for recording and storing information about events that are important to a user. The digital calendar contains data relating to each month of the present year as well as data relating to future years so that a user never has to purchase a new calendar.

2. Description of the Prior Art

Numerous types of digital calendars have been provided in the prior art. Typical of these are U.S. Pat. Nos. 3,916,172; 3,999,050; 4,152,768; 4,162,610; 4,2336,681; 4,353,178; 4,591,840; 4,630,934; 4,645,238; 7,712,923; 4,774,697; 4,780,839; 5,220,540; 5,936,625; 6,370,554 B1. Also typical of these prior art are Japanese Patent Nos. JP21346575; JP2001083267 and Canadian Patent No 1090590. While these digital calendars may be suitable for the purposes for which they were designed, they would not be as suitable for the purposes of the present invention, as hereinafter described.

U.S. Pat. No. 3,916,172

Inventor: Ralph L. Engle, Jr.

Issued: Oct. 28, 1975

A compact electronic calendar, capable of displaying any given monthly or yearly calendar period for any year from 0 to 9,999 in either the Julian or the Gregorian calendar, is disclosed. The apparatus includes a presentable calendar period selector circuit, and a display system control circuit utilizing the logic outputs of the selector circuit for correspondingly activating the display system. The selector circuit may utilize "read only" memories, And gate matrices, calculator circuitry, or the like to provide the desired logic outputs. This abstract is not to be taken either as a complete exposition or as a limitation of the present invention, however, the full nature and extent of the invention being discernible only be reference to and form the entire disclosure.

U.S. Pat. No. 3,999,050

Inventor: Satyan G. Pitroda

Issued: Dec. 21, 1976

An electronic diary having combined clock-calendar means and diary storage means is provided wherein a random access memory is employed in a diary mode of operation for the storage and readout of preselected daily schedule and message events keyed for visual display in response to equal time comparisons with real time of day TOD as generated by the clock-calendar means. The electronic diary is capable of being added to present state-of-the-art electronic calculators for facilitating economy of parts through commonality of keyboard, power supply and visual display features. The electronic diary is comprised of a keyboard selector panel, power supply means, a message storage and control unit, a clock and calendar unit, display control logic, time comparison logic, audible alarm, and visual display means. Optionally, the electronic diary is comprised of a keyboard selector panel, power supply means, memory, micro-processor circuit, and visual display means. The electronic diary can serve to remind the user of an important message event through application of an audible alarm while visually displaying the associated message data.

U.S. Pat. No. 4,152,768

Inventor: Katsumi Kuriy

Issued: May 1, 1979

An electronic apparatus with calendar is provided incorporating calculation circuitry and a display portion for displaying the up to thirty-one dates in a month and a day of the week so that a user is provided with a visual indication representative of the day of the week and the date of the month. The date of the month may be directly indicated or indicated indirectly by the day of the week indication.

U.S. Pat. No. 4,162,610

Inventor: Alfred B. Levine

Issued: Jul. 31, 1979

An electronic apparatus with calendar is provided incorporating calculation circuitry and a display portion for displaying the up to thirty-one dates in a month and a day of the week so that a user is provided with a visual indication representative of the day of the week and the date of the month. The date of the month may be directly indicated or indicated indirectly by the day of the week indication.

U.S. Pat. No. 4,233,681

Inventor: Masami Murata

Issued: Nov. 11, 1980

An electronic schedule calendar and diary for storing in an electronic memory a plurality of future calendar appointments and events for each of a plurality of daily, weekly, or other date interval periods, and enabling the selective retrieval and electronic display of said plural appointments and events for any selected time period. The electronic diary employs manually or remotely controlled entry of said future appointments and events in digital form; manually or remotely controlled correction and updating of said data; and manually controlled retrieval or readout into a visual electronic display. A time-of-day electronic clock may also be included together with an automatic alarm for providing an alarm for each selected appointment or event entered into the memory. In a systems version, a plurality of electronic diaries are employed with a central memory or monitor. Each diary is selectively placed in communication with the central memory for transfer of data therebetween.

U.S. Pat. No. 4,353,178

Inventor: Shuji Maezawa

Issued: Oct. 12, 1982

An electronic timepiece having liquid crystal or light-emitting diode display elements provides a logic network for flickering a part or all segments of the display element at a plurality of repetition rates and duty cycles, whereby additional intelligence associated with the repetition rate and duty cycle is conveyed by the display element. The logic network gives priority of display to any one preselected supplemental flickering intelligence function when there is a coincident demand for more than one supplemental function for display. Flickering draws attention to the supplemental intelligence contained in an otherwise continuous display.

U.S. Pat. No. 4,591,840

Inventor: Donald E. Curtis et al

Issued: May 27, 1986

A method of building a monthly calendar screen having abbreviated event descriptions directly translated from event descriptions on day screens. Day screens are built from keyed in dates, times, and descriptions of events related to the dates and times. Monthly screens are built by combining and abbreviating corresponding day screens. Keying and coding during day screen building, and processing steps during monthly screen building are reduced by positionally locating the first characters of day screen event descriptions, time-wise, within the monthly screens.

U.S. Pat. No. 4,630,934

Inventor: Amihadar Arber

Issued: Dec. 23, 1986

An electronic, attention attracting calendar including a base having a front surface exhibiting conventional calendar information indicia, means associated with the front surface for lighting selected areas thereon, circuit means for selectively activating and de-activating the lighting means to light at least one of the selected areas, and control and memory means for programming the circuit means.

U.S. Pat. No. 4,645,238

Inventor: James P. Vincent

Issued: Feb. 24, 1987

A method of assembling, for display, a monthly calendar annotated with exterior current day narrative notes and embedded abbreviated notes. Notes related to a specific day can be prepared on a time independent basis by calling, and keying to, a day screen for the specific day. In addition, keying is used to distinguish between normal and special notes which are to be later displayed in abbreviated and narrative forms, respectively. Upon the occurrence of the specific day and the calling of a calendar screen, the notes are displayed along with an updated calendar. Special notes appear as narrative footnotes and normal notes appear in abbreviated form with the day indications. In the absence of further day screen calling and keying, the footnotes change on a daily basis, while the abbreviated notes remain fixed.

U.S. Pat. No. 4,712,923

Inventor: Victor G. Martin

Issued: Dec. 15, 1987

An electronic calendar is provided for displaying time of the day, day of the week, and month-date-year with automatic adjustments for leap years and changes to and from standard and daylight times. The electronic calendar also displays preprogrammed and user programmed information such as holidays, holy days, birthdays, anniversaries, appointments, horoscopes, and other messages. In addition, the electronic calendar incorporates a method for randomly selecting and displaying programmed messages, such as advertisements and safety slogans, at recurring times to reinforce the user's memory of such messages.

U.S. Pat. No. 4,774,697

Inventor: Fumikazu Aihara

Issued: Sep. 27, 1988

In an electronic time-keeping apparatus wherein a plurality of schedule data is stored, chronologically readable, and displayed, schedule data input from a key input section is compared, under control of a read only memory, with a number of schedule data already stored in a random access memory, and edited in a time sequence of recency with a present date as a reference basis to permit the edited schedule data to be stored in this random access memory. A time count operation is performed each time a predetermined timing signal is output from a frequency dividing circuit. A detection is made as to whether or not there is a coincidence between present date data obtained by the time count operation and the edited schedule data stored in the random access memory to see if an appointed date is reached.

U.S. Pat. No. 4,780,839

Inventor: Takehiko Hirayama

Issued: Oct. 25, 1988

An electronic schedule display apparatus comprises a key input section for inputting schedule data, the schedule data input by the key input section consisting of day data corresponding to date data, start time data, end time data, and content data of a scheduled event; a schedule data storage section for storing the schedule data input by the key input section, a matrix display device including a large number of optical matrix display elements arranged to correspond to a matrix table of days and times, one optical matrix display element of the matrix display device corresponding to several minutes, and one hour being constituted by the display elements smaller in number than 60, and a schedule time display control section for driving the display elements of the large number of optical matrix display elements of the matrix display device between one corresponding to the start time data of the schedule data stored in the schedule data storage section and one corresponding to the end time data of the schedule data.

U.S. Pat. No. 5,220,540

Inventor: Hiroshi Nishida, et al

Issued: Jun. 15, 1993

A data processing apparatus includes a key input device, a display device, a schedule data memory for storing schedule data attached with a data and a time within the date inputted from the key input device by the day, a time calculator for calculating a present date and time based on a date and time initially set, an alarm setting device for setting a requisition of alarm in a schedule data of a desired data and time included in the schedule data stored in the schedule data memory, a comparator for comparing the present date and time outputted from the time calculator with the date and time attached to the schedule data set with the requisition of the alarm by the alarm setting device and a display controller for simultaneously displaying the schedule data set with the requisition of the alarm and other schedule data being adjacent to said schedule data when the result of the comparison by the comparator is conformable.

U.S. Pat. No. 5,936,625

Inventor: Daryl J. Kahl, et al.

Issued: Aug. 10, 1999

A method of providing a monthly calendar view in a computer system uses either textual information or vertically stacked busy bars. If the textual information is utilized, the textual information includes a start time and a brief description of the event. The textual information is interactive allowing quick and easy additions or editing. If the vertically stacked busy bars are utilized, the bars may each represent a predetermined time frame. The presence of a bar indicates an event is scheduled during that time frame. Whichever method is utilized, an enlarged full text description of the event is directly selectable by placing an icon over the event and selecting the event.

U.S. Pat. No. 6,370,554

Inventor: Chung Sun-Woo

Issued: Apr. 9, 2002

A calendar-viewing system comprising a calendar-viewing program in execution in a handheld computing device is disclosed. The calendar-viewing system has a display for presenting a calendar view to a user. In the calendar view, a period of interest is prescribed, and the user activity information for that prescribed period is shown. However, only limited or truncated text descriptions of the activities in each day of the prescribed period is provided in the calendar view. To quickly access further user activity information for a selected period within the prescribed period, the user can activate a view of a set of user activity information for the selected period. This view then replaces a portion of the calendar view.

Japanese Patent Number JP2134675

Inventor: Yamaguchi Akira

Issued: May 23, 1990

To use the calendar as a perpetual calendar by monitoring and updating the date of a real-time clock which has a calendar function by a microcomputer. The microcomputer 4, the real-time clock 5 with the calendar function, and a display controller 6 which controls an electric display device 2 with the indication of the microcomputer 4 are used to display a calendar on the electronic display device. Then the microcomputer 4 monitors the date the real-time clock 5 at all times and displays the calendar of the month of the date through a display controller 6 or the display device 2 when the month changes. Consequently, the monthly calendar is displayed automatically at all times and the perpetual calendar is obtained.

Japanese Patent Number JP2001083267

Inventor: Inoue Shigeki et al

Issued: Mar. 3, 2001

PROBLEM TO BE SOLVED: To improve the visibility of calendar information by effectively utilizing an indication space in the case a monthly calendar is indicated in a small electronic apparatus.

SOLUTION: A space necessary for indicating a calendar 230 becomes 4 lines in minimum or 6 lines at maximum depending on what day of the week the first day of the month begins and how many days the month has. Thus in the case 6 lines are necessary to indicate the calendar part, the space generated in the uppermost line of the calendar is made use of and the day-of-the week 220 and the calendar 230 uppermost line are indicated on the same line. In the case 5 lines or less is necessary to indicate the calendar, the calendar 230 uppermost line is indicated below the day of the week 220.

Canadian Patent Number 1090590

Inventor: Terao Hiroyuki

Issued: Aug. 12, 2002

A calendar display apparatus comprising a calendar display panel device indicating the 1st to the 31 st days constituting at least one month which are arranged in a plurality of rows and columns in conformity to the serial order of the seven days of the week, wherein the calendar display panel device is supplied according to a referential clock pulse signal with "day" data, "month" data and data specifying that column of a calendar table on which there falls a particular day of the week of the current month indicated bye the "month" data delivered from the data signal-generating circuit to be indicated on the calendar display panel device are successively changed by operation of a switching control unit issuing a "month-shifting instruction, and data specifying the aforesaid weekday column denoting a particular day of the week is also varied with the "month" data and indicated on the calendar display panel.

SUMMARY OF THE PRESENT INVENTION

The present invention relates generally to calendars, more specifically, to a digital calendar that is selectively mountable on a surface for recording and storing desired events that are important to a user. The digital calendar contains data relating to each month of the present year as well as data relating to future years so that a user never has to purchase a new calendar.

A primary object of the present invention is to provide a digital calendar that overcomes the shortcomings of the prior art.

Another object of the present invention is to provide a digital calendar that displays a calendar on a screen.

Yet another object of the present invention is to provide a digital calendar that is selectively editable by a user to store important dates.

Still another object of the present invention is to provide a digital calendar that has an interactive touch pad as a screen.

A further object of the present invention is to provide a digital calendar that uses a digital QWERTY keyboard as an input device for inputting information relating to a specific date.

Another object of the present invention is to provide a digital calendar that contains yearly calendar data that never needs to be upgraded.

Yet another object of the present invention is to provide a digital calendar whereby a user can store at least any individual events, recurring events, and events spanning multiple days.

Still yet another object of the present invention is to provide a digital calendar that is able to store multiple entries occurring on a single day.

A further object of the present invention is to provide a digital calendar including a scroll bar which selectively appears when multiple events are scheduled on a single day.

Yet another object of the present invention is to provide a digital calendar that is mountable by at least one of screws, magnets, rope, and suction cups.

Still yet another object of the present invention is to provide a digital calendar that can be incorporated into household appliances.

A further object of the present invention is to provide a digital calendar that uses visual reminders to remind a user of a specific event.

An even further object of the present invention is to provide a digital calendar that optionally has a color display screen.

A further object of the present invention is to provide a digital calendar that optionally has a leg to stand on a flat surface.

Another object of the present invention is to provide a digital calendar that optionally stores contact information for a plurality of contacts.

Another object of the present invention is to provide a digital calendar that optionally has a data port for connecting to a peripheral device such as a personal digital assistant.

An even further object of the present invention is to provide a digital calendar that optionally uses an audible reminder to remind a user of a specific event.

Still yet another object of the present invention is to provide a digital calendar that is inexpensive to manufacture.

One more object of the present invention is to provide a digital calendar that is simple and easy to use.

Additional objects of the present invention will appear as the description proceeds.

The foregoing and other objects and advantages will appear from the description to follow. In the description reference is made to the accompanying drawing, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawing, like reference characters designate the same or similar parts throughout the several views.

BRIEF DESCRIPTION OF THE DRAWING FIGURES

In order that the invention may be more fully understood, it will now be described, by way of example, with reference to the accompanying drawing in which.

DESCRIPTION OF THE REFERENCED NUMERALS

Figure 1:
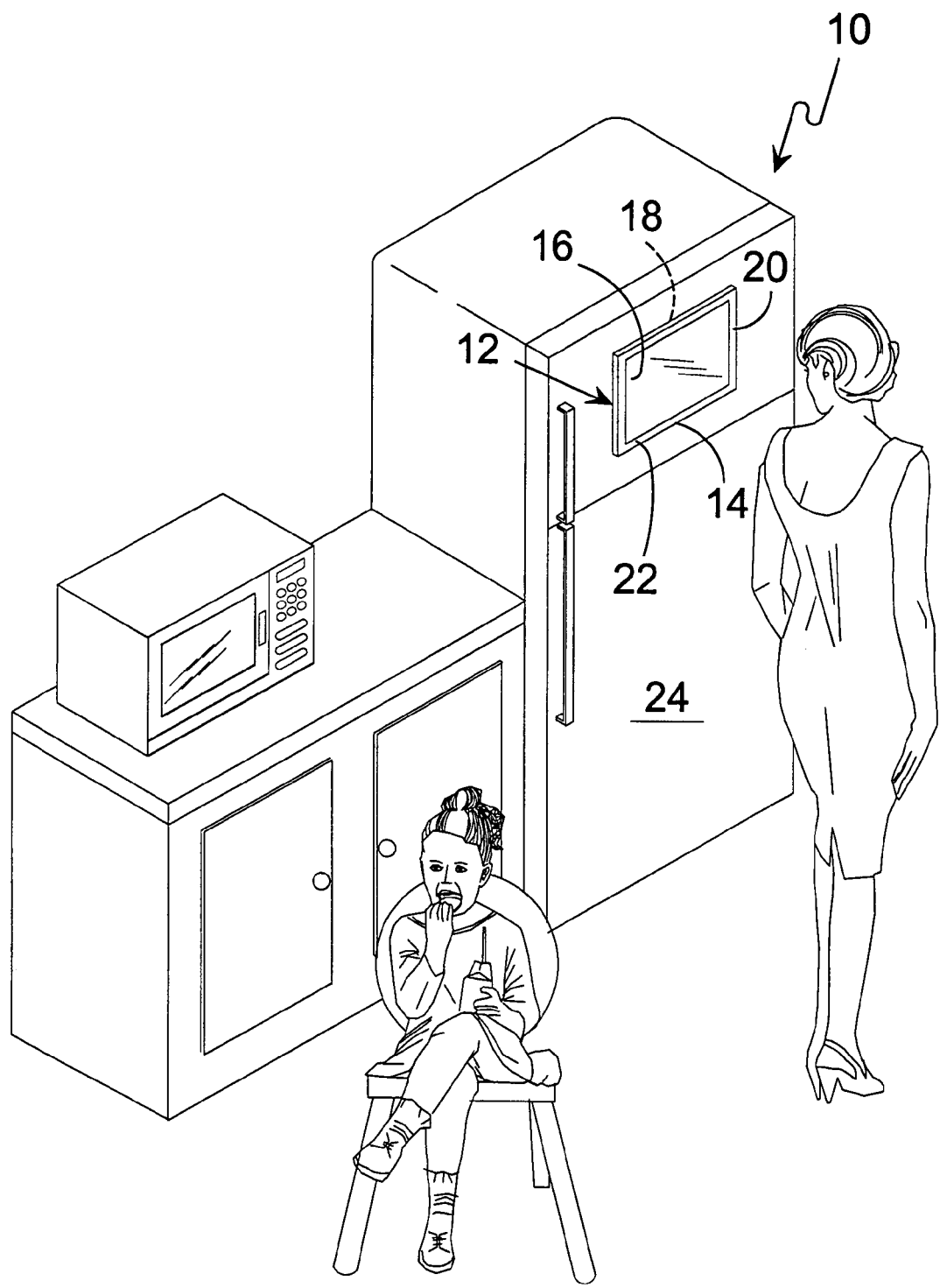
FIG. 1 is an illustration of the present invention in use.

Turning now descriptively to the drawings, in which similar reference characters denote similar elements throughout the several views, the Figures illustrate the calendar display planner of the present invention. With regard to the reference numerals used, the following numbering is used throughout the various drawing Figures.

| | |
|---|---|
| 10 | digital calendar of the present invention |
| 12 | housing |
| 14 | front side |
| 16 | screen |
| 18 | rear side |
| 20 | frame |
| 22 | power switch |
| 24 | refrigerator |
| 26 | calendar display |
| 28 | calendar year |
| 30 | calendar month |
| 32 | calendar day of week |
| 34 | calendar day |
| 36 | calendar traditional notation |
| 38 | calendar display toggle button |
| 40 | maximize button |
| 42 | display inputs button |
| 44 | previous month button |

| | |
|---|---|
| 46 | next month button |
| 48 | user event |
| 50 | user message |
| 52 | user recurring event |
| 54 | multi-day event |
| 56 | recurring event indicator |
| 58 | event indicator |
| 60 | message indicator |
| 62 | day indicator |
| 64 | day select button |
| 66 | event button |
| 68 | message button |
| 70 | recurring event button |
| 72 | keyboard |
| 74 | end button |
| 76 | speaker |
| 78 | power source |
| 80 | power source compartment |
| 82 | magnetic strip |
| 84 | screw eyehole |
| 85 | fastener hook |
| 86 | grips |
| 88 | scroll bar |
| 90 | scroll up |
| 92 | scroll down |
| 94 | contact button |
| 96 | processor |
| 98 | memory |
| 100 | calendar database |
| 102 | input/output port |
| 104 | leg |

DETAILED DESCRIPTION OF THE PREFERRED EMBODIMENTS

The following discussion describes in detail one embodiment of the invention and several variations of that embodiment. This discussion should not be construed, however, as limiting the invention to those particular embodiments. Practitioners skilled in the art will recognize numerous other embodiments as well. For a definition of the complete scope of the invention, the reader is directed to the appended claims.

Turning now descriptively to the drawings, in which similar reference characters denote similar elements throughout the several views, FIGS. 1 through 14 illustrate the digital calendar of the present invention generally by the numeral 10.

Referring to FIG. 1, shown is an illustration of the present invention in use. The present invention is a calendar-like display planner (10) comprised of a housing (12) having a display screen (16) mounted therein. While in the off position the display monitor (16) is blank thereby creating an aesthetically pleasing article. The housing (12) is comprised of a front surface (14) having a frame (20) available in multiple colors to blend in with any decor with the display screen (16) mounted therein. The housing (12) can be incorporated into an appliance, such as a refrigerator (24), or the housing (12) may contain a back surface (18) having means for fastening said digital calendar display planner (10) to a vertical surface, such as a refrigerator (24), cabinet door or wall. Positioned on the front of the display planner is a power button (22) for energizing the device and once energized for shutting off the device which will also power down if left inactive for a predetermined period of time.

Figure 2:
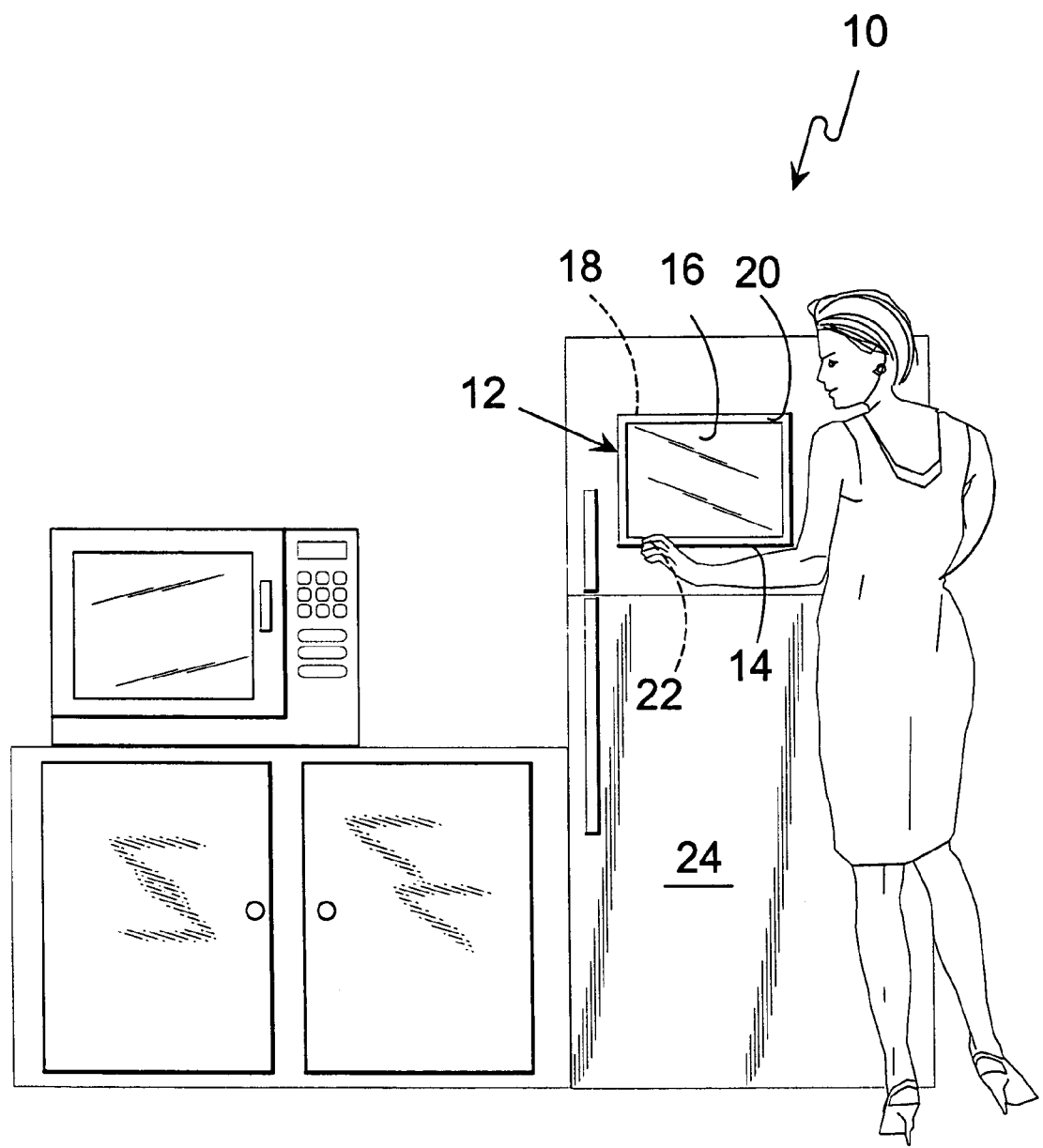
FIG. 2 is an illustration of a user powering on the calendar display planner of the present invention.

Referring to FIG. 2, shown is an illustration of a user powering on the calendar display planner (10) of the present invention. While in the off position the display monitor (16) is blank thereby creating an aesthetically pleasing article. Once it is turned on (22) the display (16) depicts a traditional calendar monthly layout with the traditional notation, such as holidays and religious events. To turn off the display, the power button is depressed again or if left inactive for a predetermined period of time, the display is automatically shut off to conserve power. The present invention (10) is comprised of a housing (12) having a display screen (16) mounted therein. The housing (12) is comprised of a front surface (14) having a frame (20) available in multiple colors to blend in with any decor with the display screen (16) mounted. The housing (12) can be incorporated into an appliance, such as a refrigerator (24), or the housing (12) may contain a back surface (18) having means for fastening said display planner to a vertical surface, such as a refrigerator (24), cabinet door or wall. Positioned on the front of the display planner (10) is a power button (22) for energizing the device.

Figure 3:
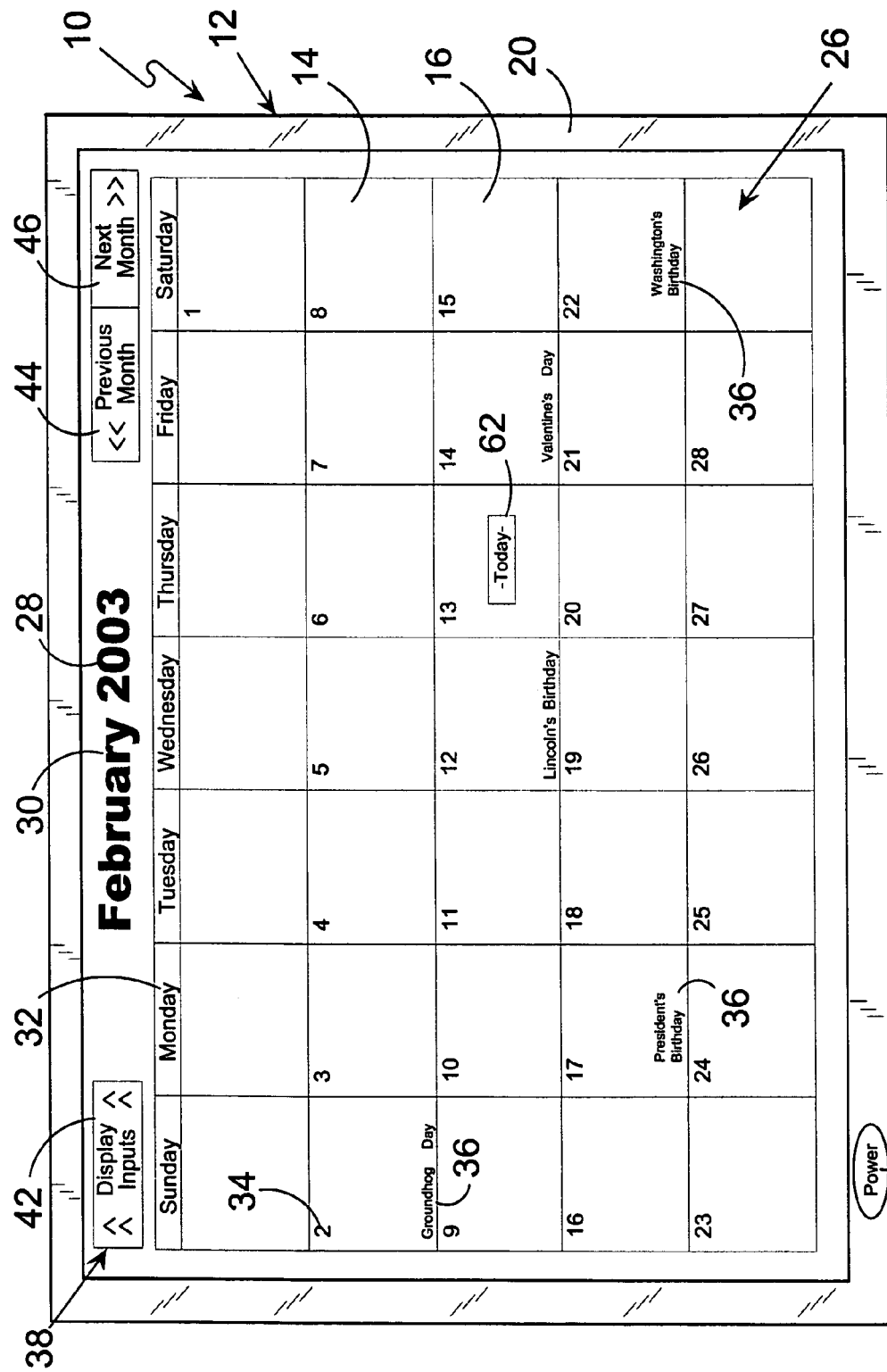
FIG. 3 is the calendar display planner in the on mode.
Figure 4:
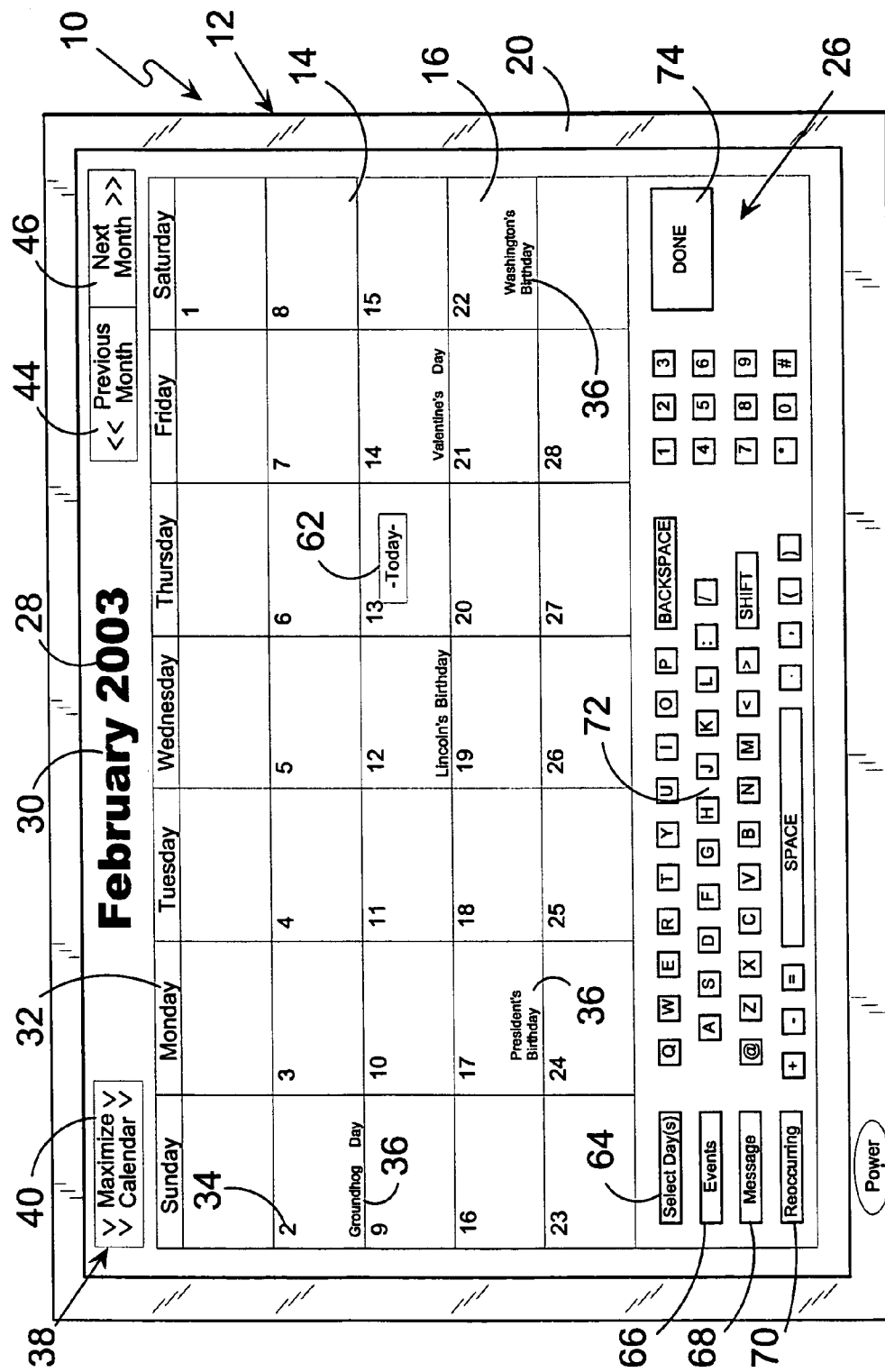
FIG. 4 is the calendar display planner having a minimized monthly display and touch screen memo function.

Referring to FIG. 3, shown is the calendar display planner (10) in the on mode. As previously noted, in the off position the screen (16) in the preferred embodiment is blank. Once the power button (22) is depressed the screen display (26) shows a typical monthly grid for the current year (28) and month (30) along with the heading for day of the week (32) with the appropriate calendar day (34) along with a today indicator (62). Also shown are traditional notations (36) such as holiday's, religious event, etc. Once the calendar display planner (10) has been turned on and the traditional calendar month is displayed, the user is provided with means for displaying past months by touching the previous month graphic (44) or future months by touching the next month graphic (46). Furthermore, the display calendar (26) has a calendar display toggle button (38) that initially displays 'Display Inputs' (42) when the calendar display planner is first turned on with the monthly display in its maximized state. When the user touches the graphic icon (42), the calendar image is reduced in size and text messages can be entered via a touch screen keyboard Referring to FIG. 4, shown is the calendar display planner (10) having a minimized monthly display and touch screen memo function. As noted, the calendar display planner (10) is comprised of a housing (12) with frame (20), available in multiple colors to blend in with any décor, having a display screen (16) mounted therein with means of incorporating the housing (12) into an appliance, such as a refrigerator (24) or for fastening said display planner to a vertical surface, such as a refrigerator (24), cabinet door or wall. While in the off position the display monitor (16) is blank thereby creating an aesthetically pleasing article. Once powered on (22) the display (16) depicts a traditional calendar month layout with the traditional notations, such as holidays and religious events for said month. By touching the 'Display Inputs' (42) of calendar display toggle button (38), the display calendar (26) will change from a maximized monthly display to a minimized monthly display with touch screen keys for entering notational items for one or more days. To enter notational items for one or more days, the user selects the day or days using the day select button (64) and touch screen keyboard (72). Then the type of notation using either the event button (66) or message button (68) and enters the text via touch pad keyboard (72). Additionally the notation can be flagged as a recurring notation using the recurring event button (70) and selecting a period of time for the recurring event.

Figure 5:
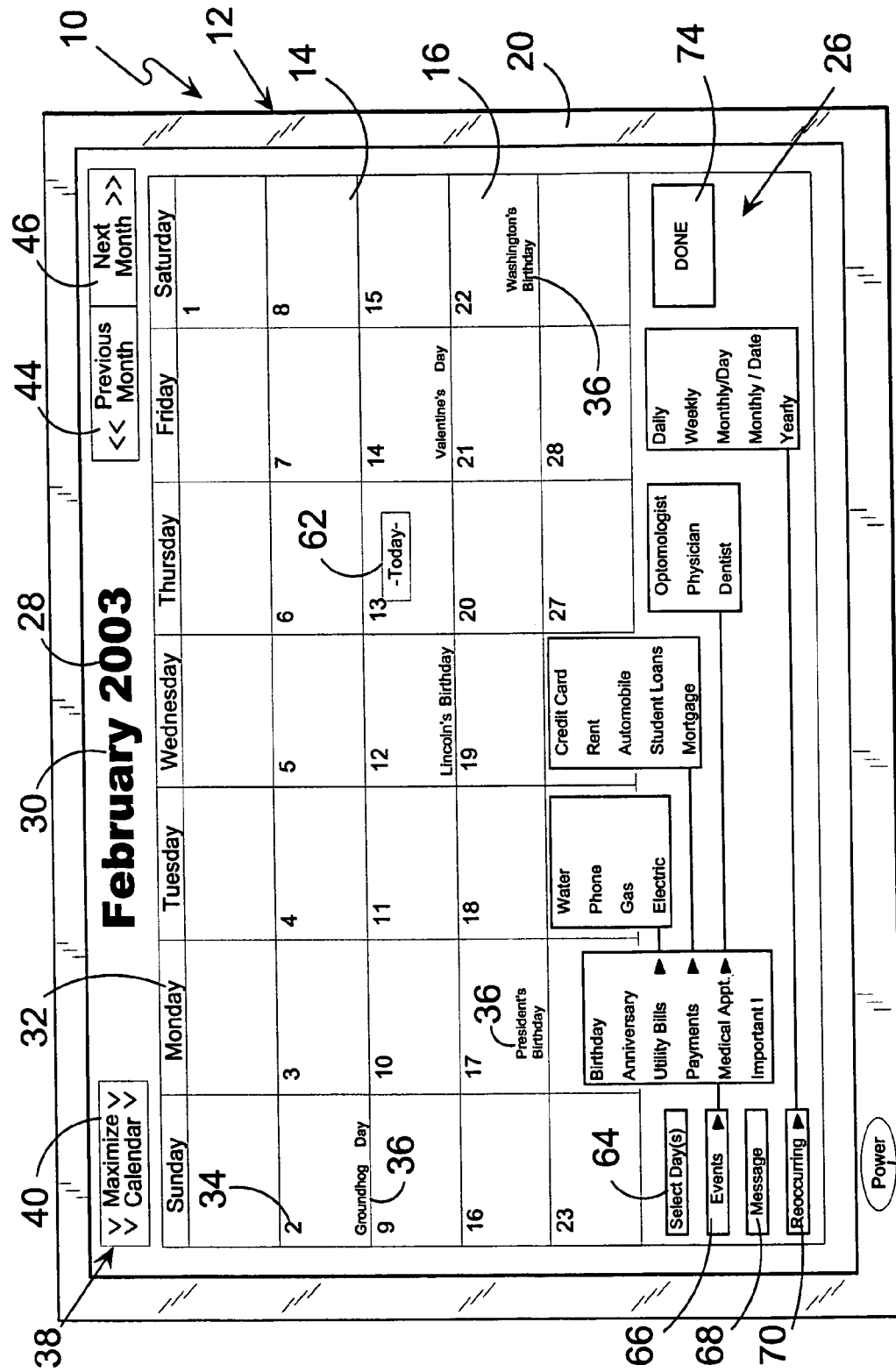
FIG. 5 is one possible embodiment of the editing notation of the present invention.

Referring to FIG. 5, shown is one possible embodiment of the editing notation of the present invention. For the sake of clarity the keyboard is removed from the figure. When a user touches the calendar display toggle button (38) the maximized monthly display is minimized and the editing functions are displayed. The user adds notations to the calendar using the editing buttons (64, 66, 68, 70). To add a notation the user presses the select days button (64) and specifies what day or days the notation is for. Then the user selects either the event button (66) or message button (68). If the message button is selected, the user enters the text using keyboard (72). When the text is finished the end button (74) is pressed and the text message is displayed in the appropriate day. If an event is selected a series of menus are displayed whereby the user can select from a library of events (66). In either case the user can additionally depress the recurring button (70) and select from a menu of time durations. Once selected the display planner (10) will apply the recurring message to all of the user selected time periods. When the user has finished adding notations to the calendar, pressing the maximize button (40) will display the month in the expanded format.

Figure 6:
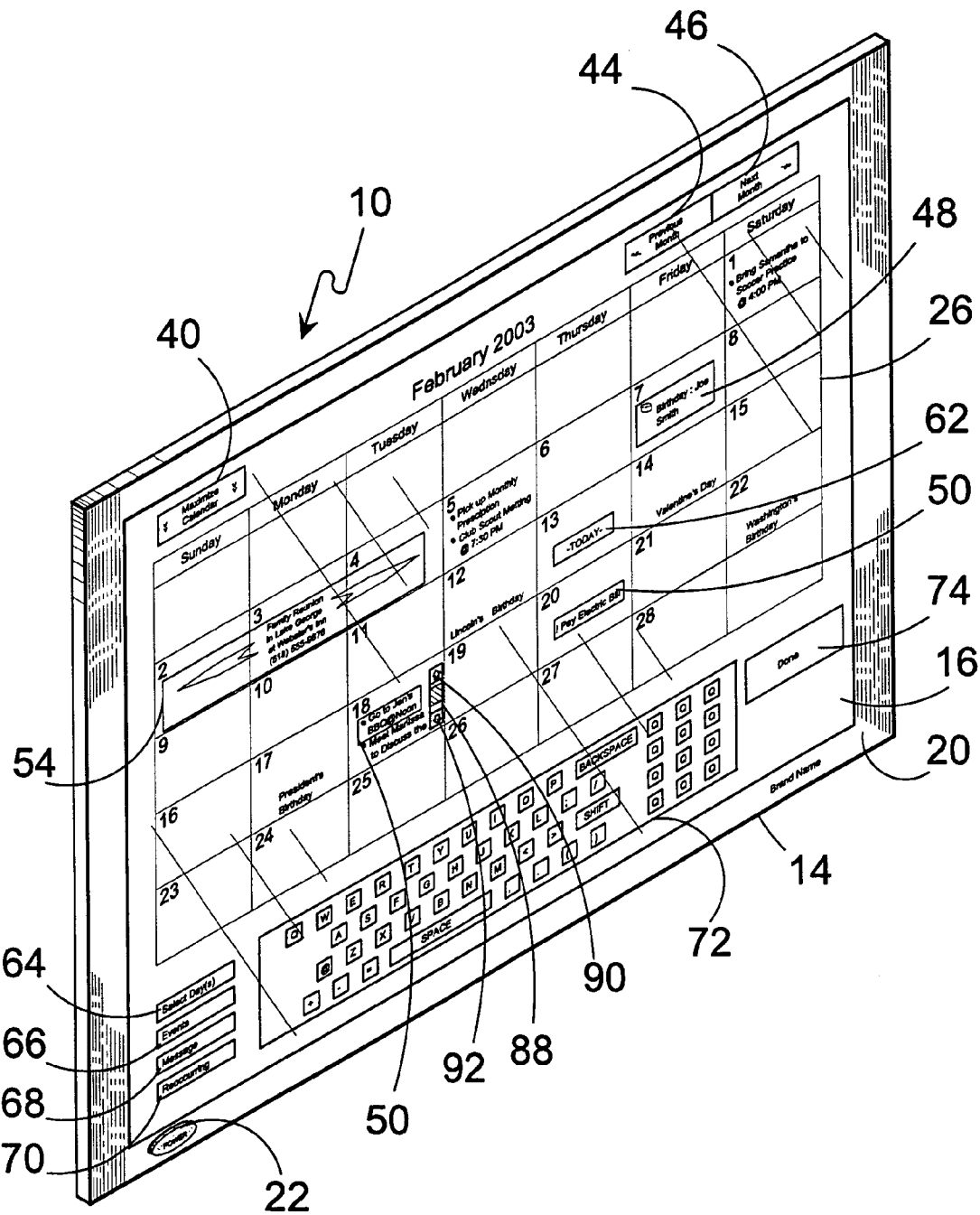
FIG. 6 is a perspective view of the digital calendar display planner of the present invention.

Referring to FIG. 6, shown is a perspective view of the digital calendar display planner (10). As previously stated the display planner (10) has a front side (14) with a frame (20) available in multiple colors to blend in with any decor having a display screen (16) which display a calendar (26) when power (22) is engaged. The calendar is displayed in the expanded format with all of the user notations. If a user wants to add a notation then they press the button which will minimize the monthly display where then notations can be added using the notation editing buttons (64, 66, 68, 70), keyboard (72) and end button (74). More than one notation can be displayed. When more than one notation is entered for a date the user is presented with a scroll bar (88) within the selected day. The scroll bar (88) has a scroll up indicator (90) and a scroll down indicator (92) for moving through the notations. In addition to having more than one message for any particular day, the user may also assign a message (54) to multiple days whereupon the digital display planner will display some type of graphic through the selected days. Once the editing is finished the user presses the maximize calendar button (40) and the monthly display is expanded to the full screen (26).

Figure 7:
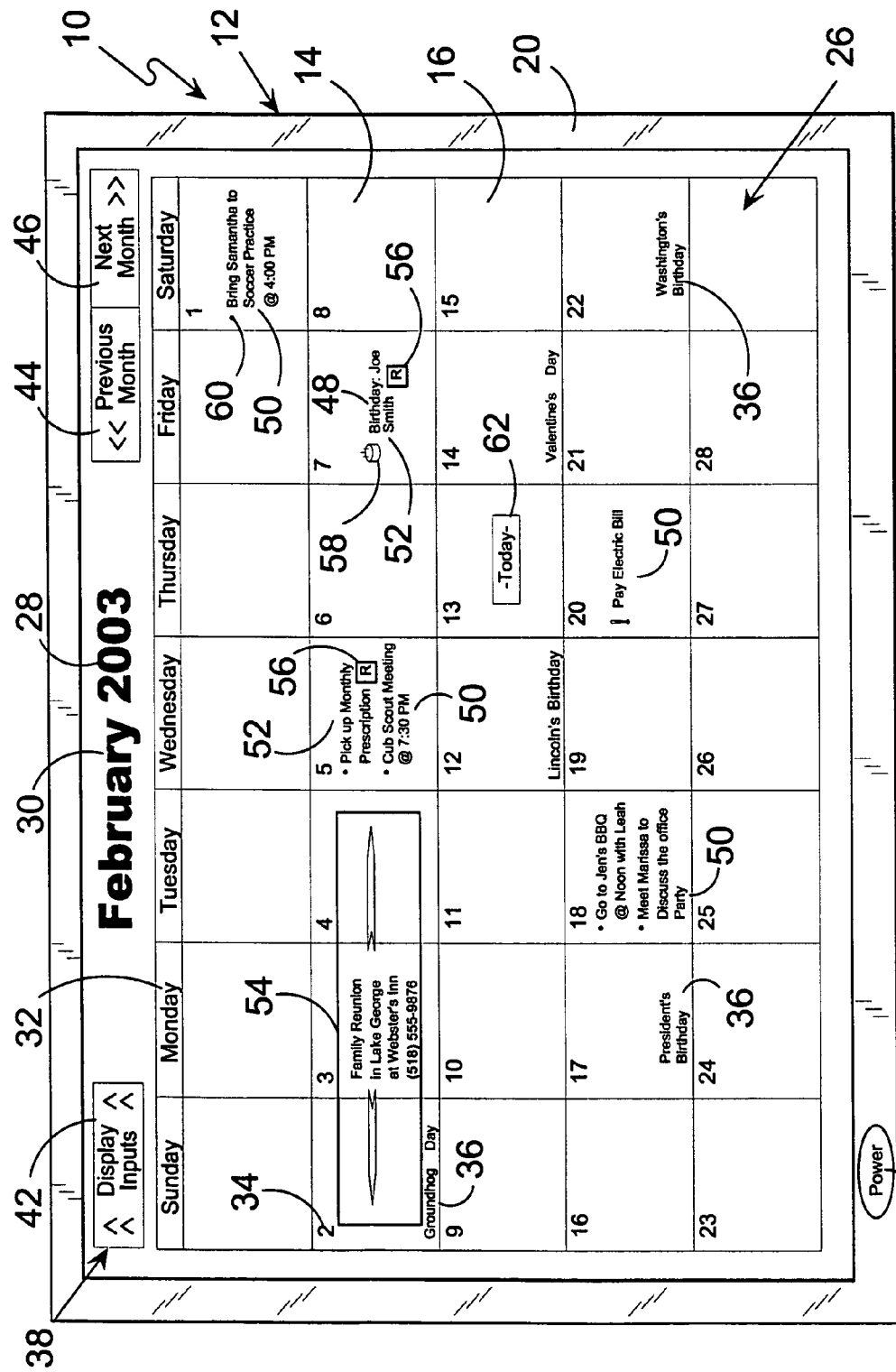
FIG. 7 is an expanded view of the current month of the present invention.

Referring to FIG. 7, illustrated is the expanded view of the current month. As shown, once the user powers on the digital calendar display planner (10) by depresses the power button (22) the current month is display in its maximized state. This is also the calendar display (26) that is displayed after text editing is complete and the calendar display toggle button (38) is selected having the graphic 'Maximize Calendar' displayed. The user selected month is displayed with all the appropriate notation specified by the user. The user is able to discern the type of notations that have been made by icons that are displayed with the calendar notations. A text message (50) can have a bullet (60) in front of the message while an event (48) can have an icon (58) which can add appeal to the notation made by the user. It should also be noted that events (48) or messages (50) can also be designated as recurring (52) which will additionally have an appropriate icon (56). Along with the user's entered notations, the calendar displays various other notations considered to be traditional and can be tailored to the country or region using the present invention. It should also be noted that while the illustrations have notation in English, the digital calendar display planner can be programmed to function with any predetermined language.

Figure 8:
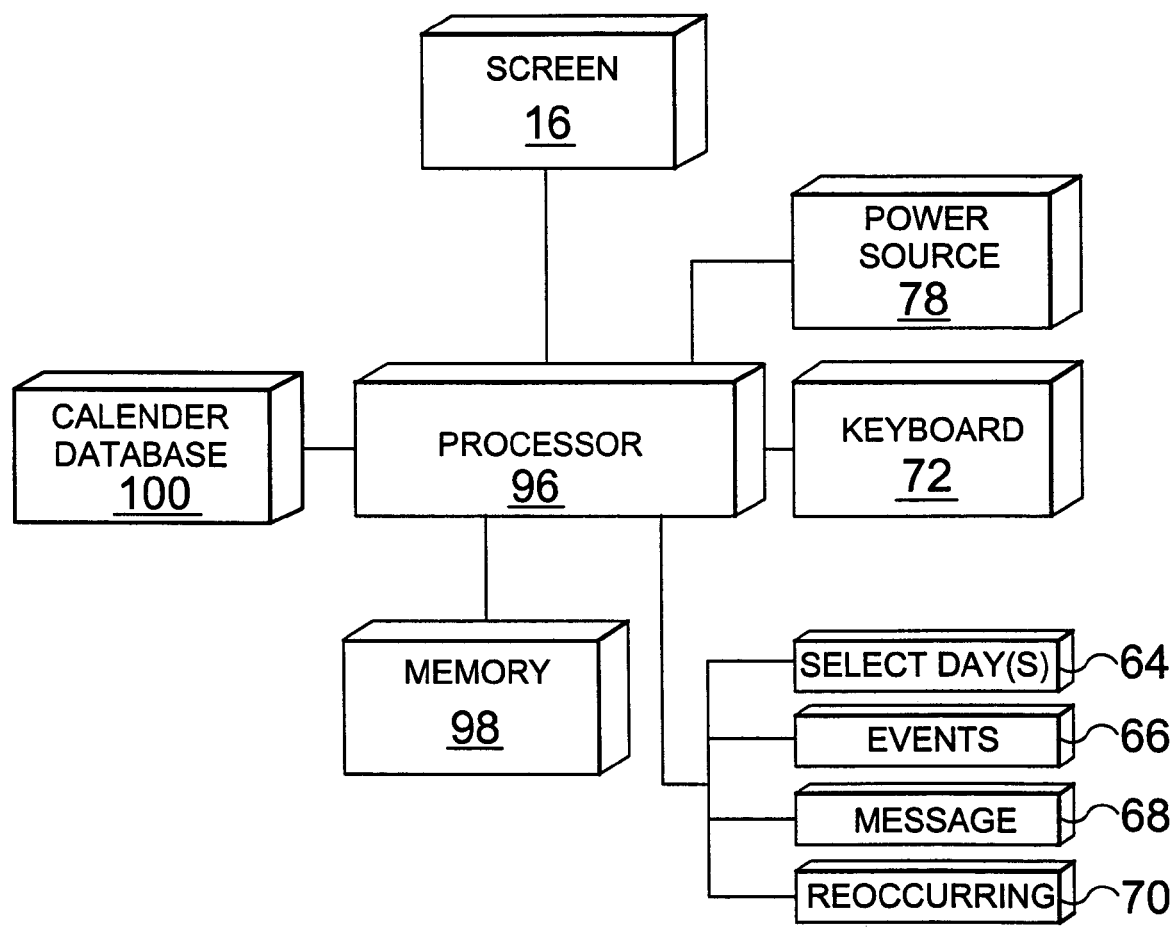
FIG. 8 is a block diagram of the processing performed by the present invention.

Referring to FIG. 8, shown is a block diagram of the processing performed by the present invention. Once power (22) is applied to the present invention, the processor (96) retrieves the current month and all applicable user notations for the current month and displays them on the screen (16) in maximized monthly format. If the user selects the display inputs button (42), the processor (96) minimizes the monthly display and adds the text editing buttons (64, 66, 68, 70) and keyboard (72). While the user edits the calendar, the processor (96) uses memory (98) and calendar database (100) to record the user's input. Once the text editing functions are complete and the user again selects the maximize calendar (40) graphic displayed by the calendar display toggle button (38) the calendar display (26) is maximized to full screen.

Figure 9:
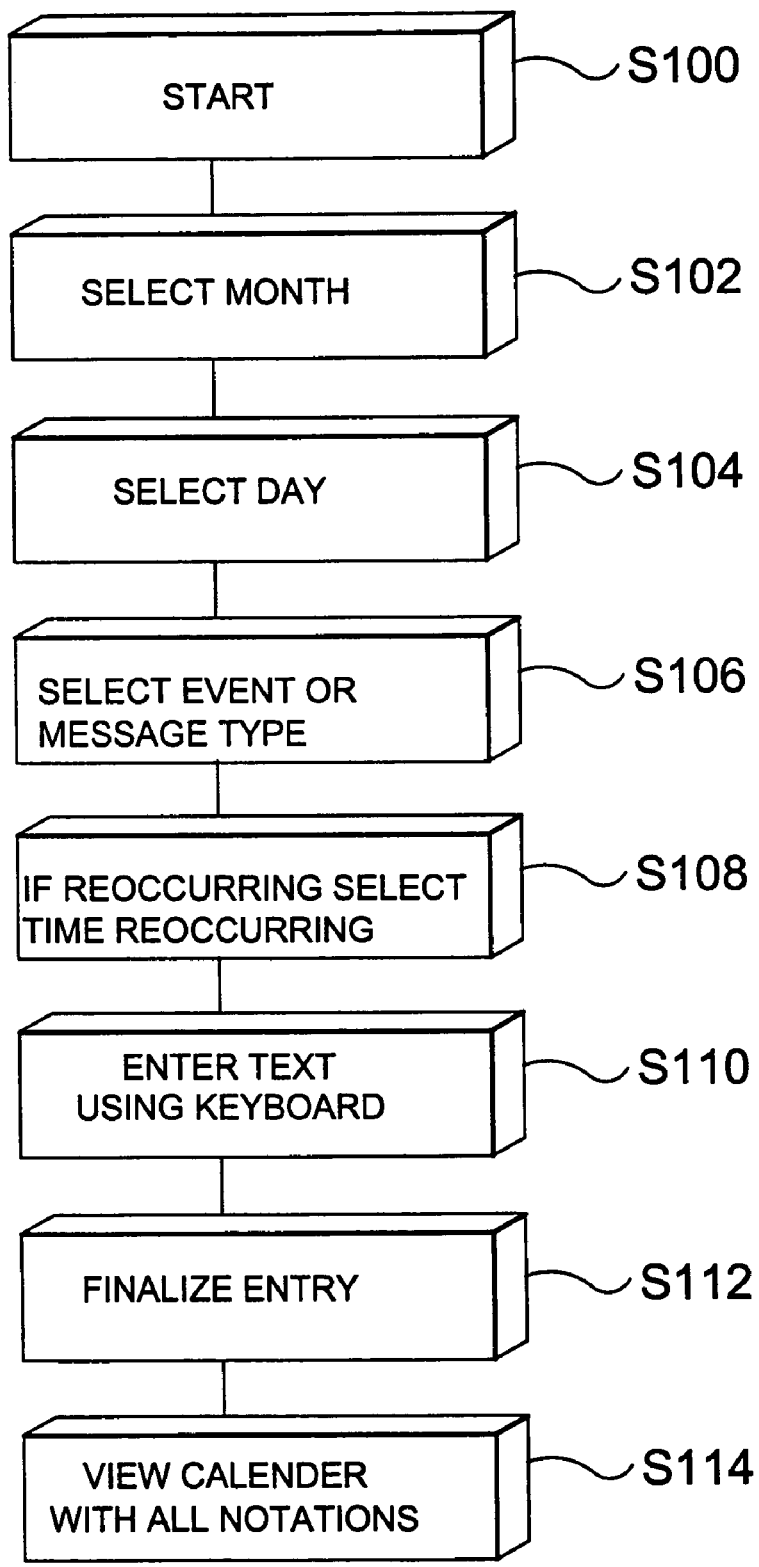
FIG. 9 are the steps used in the text editing function whereby the user can add, change, or delete calendar notations.

Referring to FIG. 9, shown are the steps used in the text editing function whereby the user can add, change, or delete calendar notations. The user first starts the device (S100) by engaging the power switch (22). The display planner (10) display the current month in maximized form with all traditional notations and user entered notations. To make notations the user keeps the current month displayed or using buttons (44, 46) selects another month (S102). Once selected the user engages the editing functions by pressing the display inputs button (42) which will minimize the monthly display and display the keyboard (72) and editing buttons (64, 66, 68, 70). Once displayed the user selects a day or days for editing (S104) and whether the notation type is an event or message (S106). Additionally the notation can be flagged as recurring (S108). Once the notation has been made using the keyboard (S110), the editing is finalized by pressing the end key (S112) and the month is displayed with the notations (S114).

Figure 10:
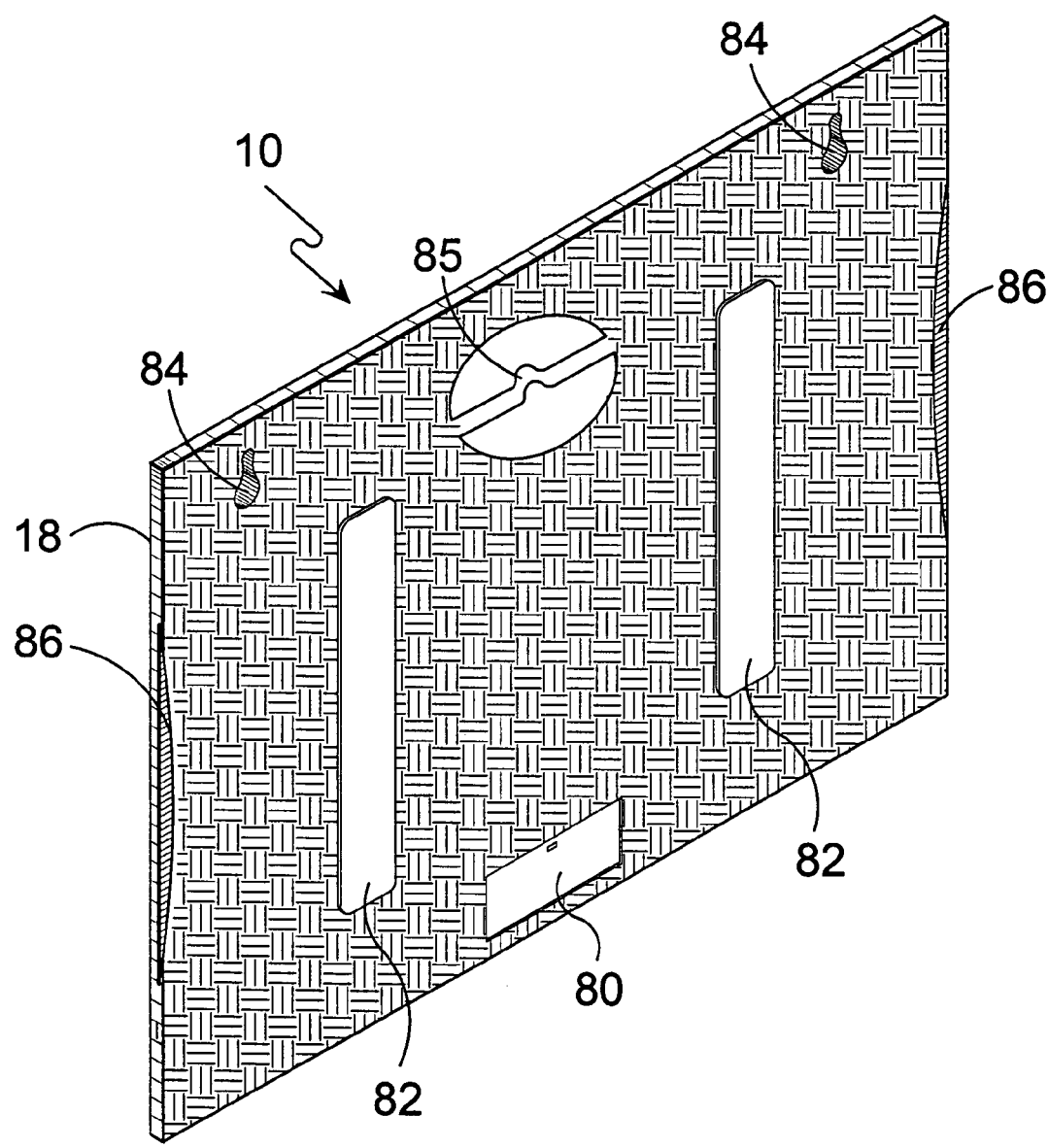
FIG. 10 is a back view of the preferred embodiment of the present invention.

Referring to FIG. 10, shown is the back side of the preferred embodiment of the present invention. The digital calendar display planner has various means for fastening the present invention to a vertical surface. The back side (18) has spaced apart screw eyeholes (84) and fastener hook (85) for attaching the digital calendar display planner to preexisting fasteners. The display (10) also has a pair of spaced apart magnetic strips (82) for magnetically fastening the display to magnetic articles, such as refrigerators. Additionally positioned on opposing sides of the display are recessed grips (86) which help in handling the device (10). Another option for housing the digital calendar display planner (10) is to incorporate the present invention (10) directly into a household appliance, in which case the back side embodiment shown if FIG. 10 would not be required.

Figure 11:
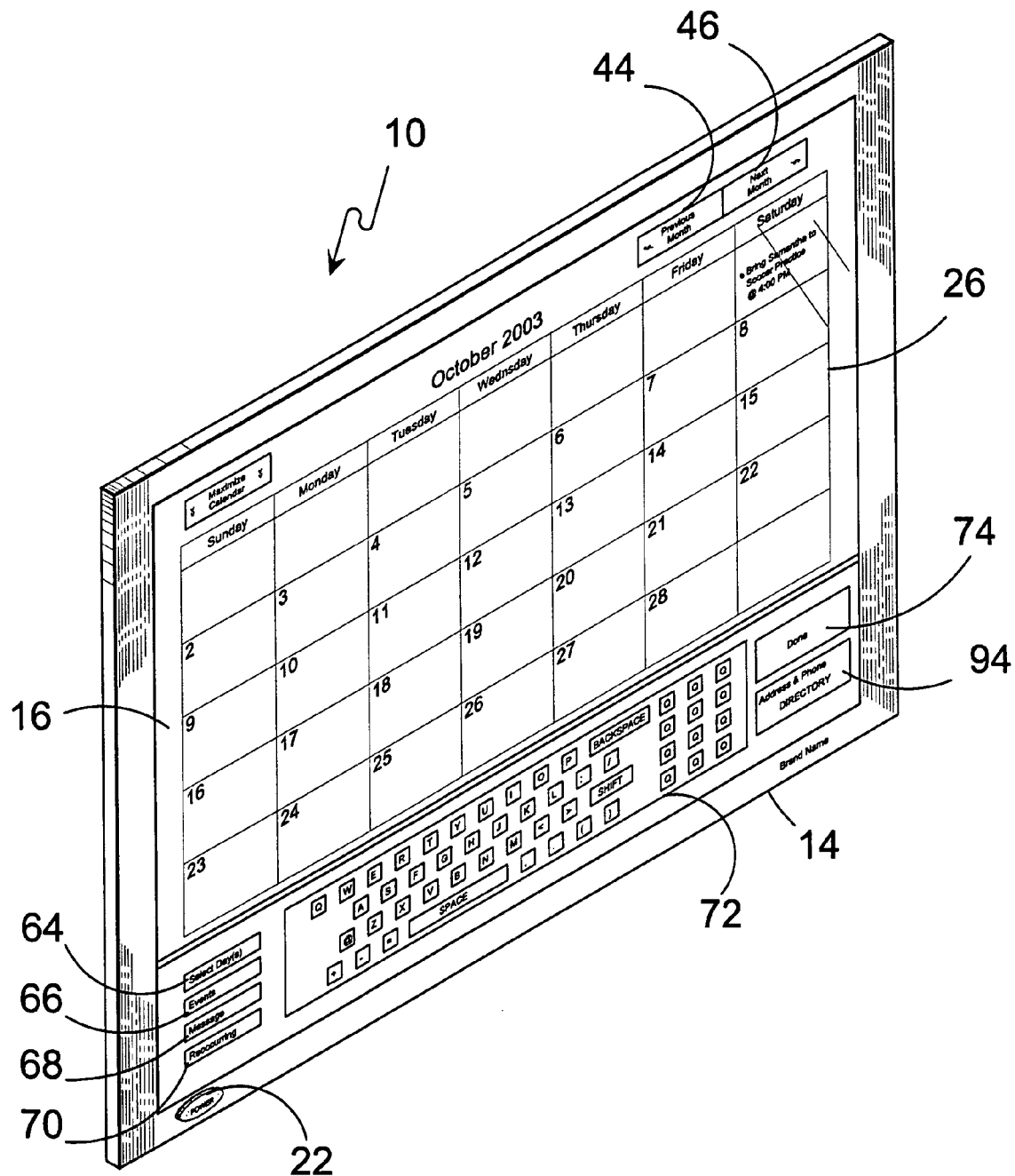
FIG. 11 is the display of the present invention having an additional element in the form of an address and phone directory.

Referring to FIG. 11, shown is the display of the present invention (10) having an additional element in the form of an address and phone directory (94) whereby the digital calendar display planner (10) can be used to store telephone numbers and addresses. The additional function would be displayed when the user selects the editing functions of the present invention.

Figure 12:
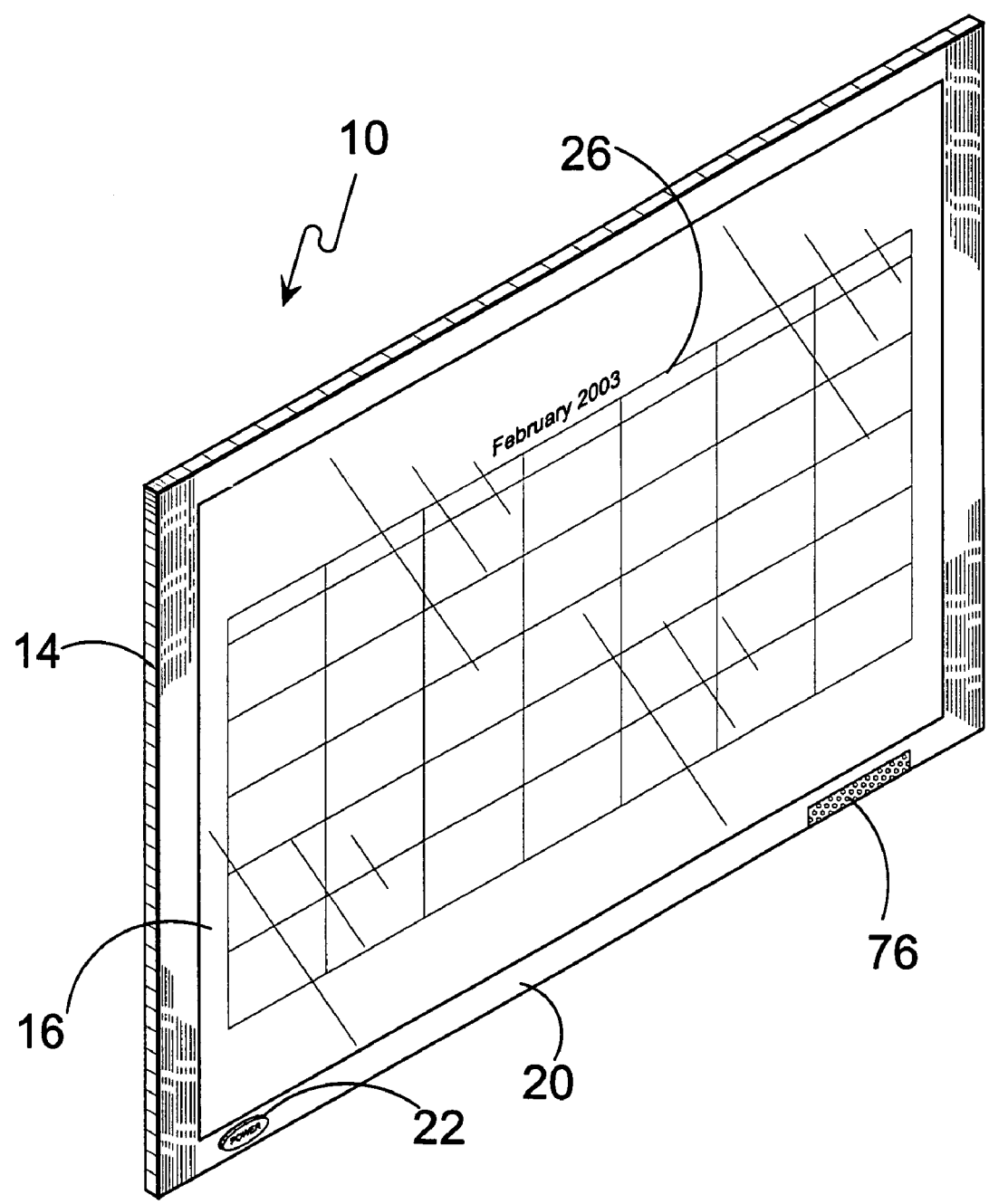
FIG. 12 is the display of the present invention having another additional element in the form of a microphone.

Referring to FIG. 12, shown is the display of the present invention (10) having another additional element in the form of a microphone (76) for adding audio capabilities to the digital calendar display planner (10). The microphone would be wired into the frame (20) and would be available for use when the power is applied using power switch (22). Another additionally element is shown wherein when the display is turned off the monthly grid will continue to be visible forming an integral part of the display (26).

Figure 13:
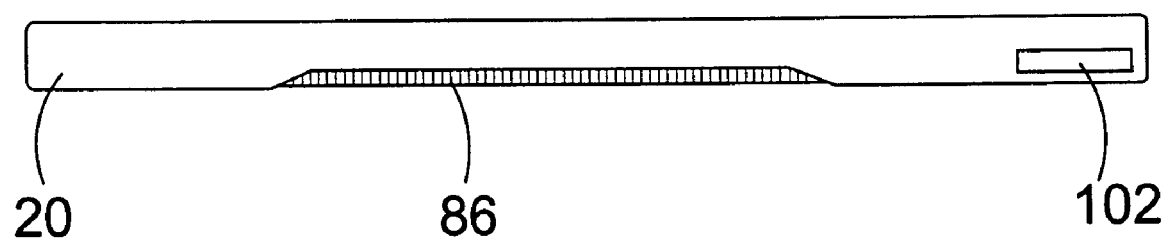
FIG. 13 is another additional element of the present invention.

Referring to FIG. 13, shown is another additional element of the present invention. The digital calendar display planner (10) can additionally have means for uploading and downloading the calendar database containing all of the user's notation using input/output port (102) which can be positioned anywhere found appropriate, such as within the frame (20) along with the grips (86).

Figure 14:
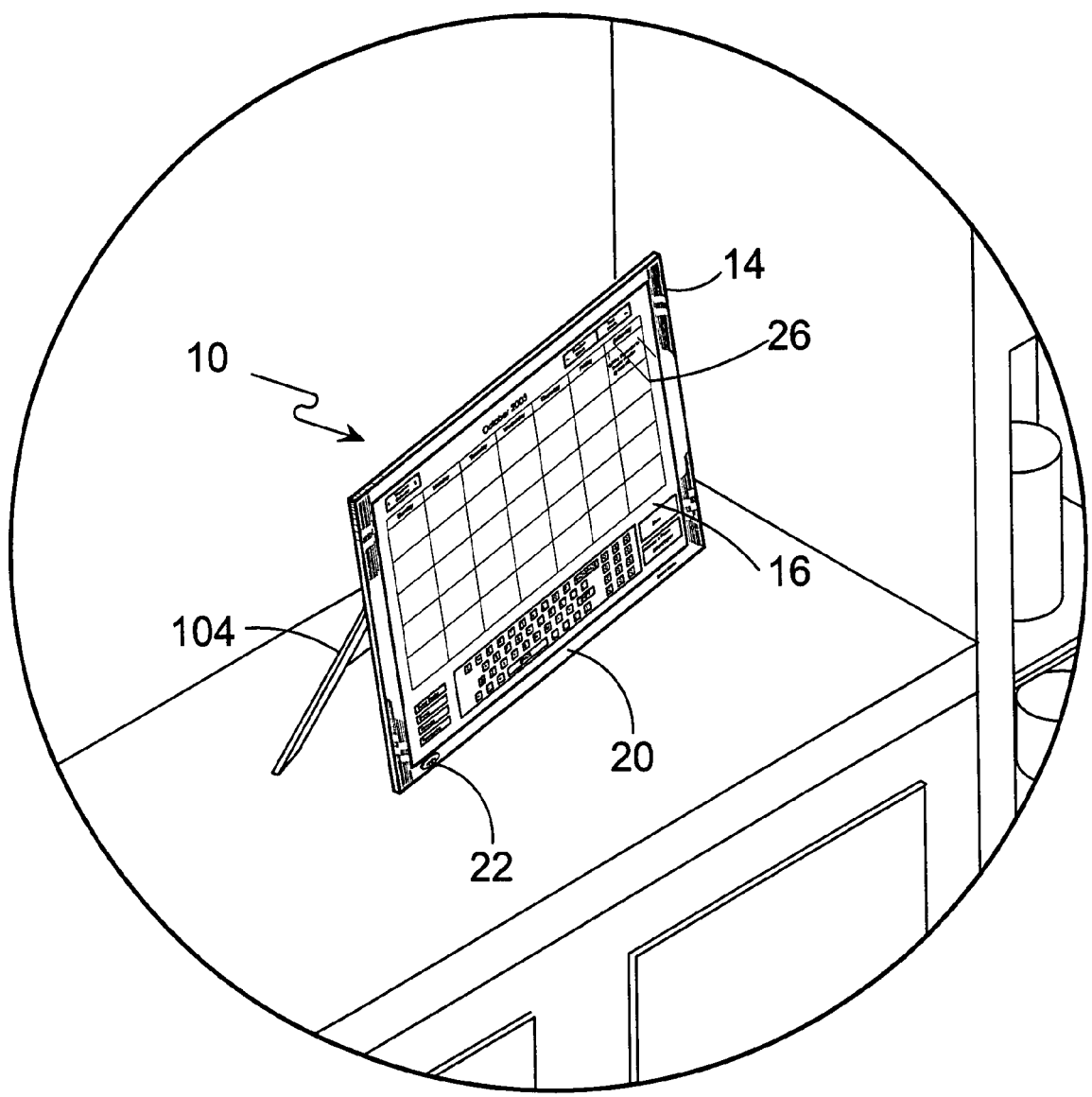
FIG. 14 is another additionally element of the present invention.

Referring to FIG. 14, shown is another additionally element of the present invention. The digital calendar display planner (10) can further include legs (104) whereby the display can be positioned on a horizontal surface, while in the preferred embodiment the digital calendar display planner (10) is releasably fastened to a vertical surface, such as a refrigerator, cabinet door or wall.

What is claimed is new and desired to be protected by Letters Patent is set forth in the appended claims:

1. A digital calendar display planner comprising;
 a) a housing having a front side;
 b) a display comprising a touch screen positioned within said front side;
 c) a calendar database for storing calendar data and user entered notations within said housing;
 d) a microprocessor within said housing for manipulating said calendar database data and said user notations;
 c) a power supply for energizing said microprocessor;
 d) a power switch on said housing for tuning said power supply on and off;
 e) said touch screen displaying a calendar; and
 f) said touch screen including a button for toggling between a first position wherein said calendar fills the whole screen and a second position wherein the calendar is reduced in size and a touch screen keyboard is displayed on said screen adjacent said calendar along with editing buttons in the calendar itself including a select day button, an event button, a message button and a recurring event button, said calendar having a box for each day covered by the calendar for displaying within each box information keyed in from said keyboard, said keyboard having a text edit function, and said planner being completely self contained with all information displayed on said touch screen being stored within said calendar data base, said recurring event button for flagging as a recurring notation on said calendar.

2. The digital calendar display planner as recited in claim 1, wherein the screen displays one mouth at a time.

3. The digital calendar display planner as recited in claim 2, wherein said screen has graphic display icons and one of the graphic display icons provides means for selecting a calendar month prior to the current calendar month.

4. The digital calendar display planner as recited in claim 3, further comprising a back side having means for fastening said display planner to a magnetic article.

5. The digital calendar display planner as recited in claim 3, further comprising a back side having spaced apart magnetic for attaching said display planner to a magnetic surface.

6. The digital calendar display planner as recited in claim 3, further comprising a back side having aperture means for fastening said display planner to existing fasteners.

7. The digital calendar display planner as recited in claim 3, in which the housing is incorporated into a household appliance.

8. The digital calendar display planner as recited in claim 3, further comprising a microphone providing means for recording and playing audible messages.

9. The digital calendar display planner as recited in claim 3, having an electronic name and address book.

10. The digital calendar display planner as recited in claim 3, further comprising hinged legs wherein said display can be positioned to stand on a vertical surface.

* * * * *